April 8, 1930.  M. F. CARR  1,754,210

FASTENER

Filed Oct. 5, 1928

Inventor:
Moses F. Carr
by Emery, Booth, Janney & Varney
Attys

Patented Apr. 8, 1930

1,754,210

UNITED STATES PATENT OFFICE

MOSES F. CARR, OF LEXINGTON, MASSACHUSETTS, ASSIGNOR TO UNITED-CARR FASTENER CORPORATION, OF CAMBRIDGE, MASSACHUSETTS, A CORPORATION OF MASSACHUSETTS

FASTENER

Application filed October 5, 1928. Serial No. 310,659.

My invention aims to provide improvements in fasteners particularly adapted for attachment to rigid structures without the aid of a setting tool at the inner side of the rigid structure.

In the drawings, which illustrate a preferred embodiment of my invention:—

Figure 5:
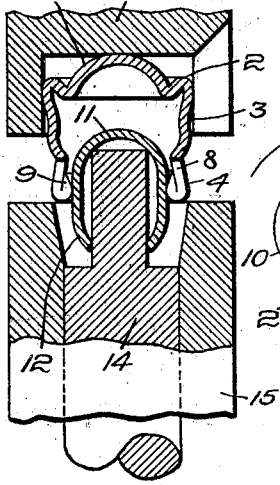
Figure 4:
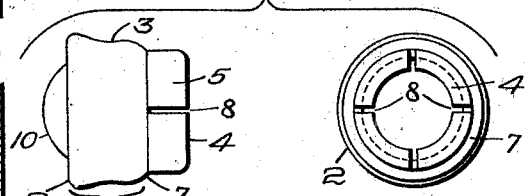

Fig. 4 includes a side elevation and a rear elevation, respectively, of the stud before attachment to a support; and Fig. 5 shows one method of assembling the expanding element with the stud.

Referring to the embodiment of my invention illustrated by the drawings, I have shown a fastener member which, in this instance, is in the form of a stud unit of a separable fastener attached to a wind shield post.

Figure 1:
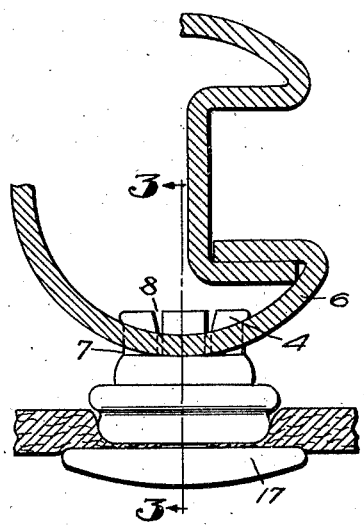
Figure 1 is a plan section taken through a portion of a wind shield post showing a fastener stud secured thereto, a socket being shown connected to the fastener stud.
Figure 2:
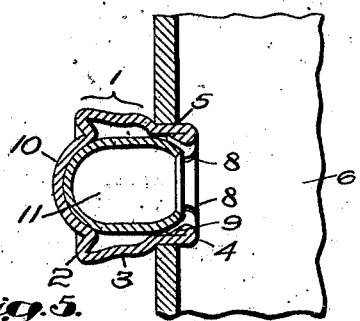
Fig. 2 is a section taken through the stud unit and wind shield post to show the fastener before the attaching means has been expanded.

The stud member shown is formed from a single piece of sheet metal pressed out to provide a socket-receiving portion 1 at one end which includes the head portion 2 and neck 3. At the other end of the stud member I have provided a tubular-shaped attaching portion 4 having an outer wall 5 which is adapted to be expanded to secure the fastener stud to a support 6, as shown in Figs. 1 and 2. Between the socket-receiving portion 1 and the attaching portion 4, I have provided an annular shoulder 7 seating against one face of the support 6.

Figure 3:
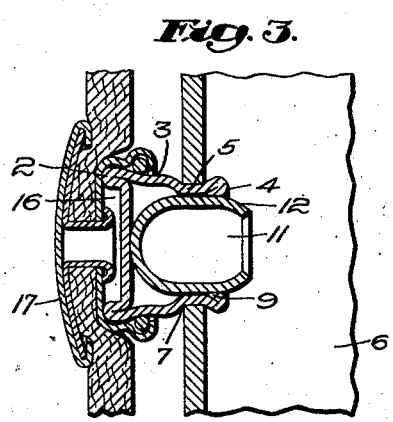
Fig. 3 is a section taken on the line 2—2 of Figure 1, showing the attaching means expanded.

The attaching portion is preferably divided by slits 8 so that the outer wall may be easily expanded. At the free end of the attaching portion I have provided a tapered wall 9 formed by bending inwardly the material between the slits 8, as shown in Figs. 2 and 3.

The outer end of the socket-receiving portion 1 is closed and the metal is pressed out to provide a dome or bulge 10, as illustrated in Figs. 2 and 4.

Within the fastener body, I have provided an axially movable expanding element 11 which has a tapered end portion 12. This expanding element is made of sheet metal and is assembled with the body of the fastener, at the point of manufacture, in any suitable manner. In Fig. 5, I have illustrated one method of assembling the parts. The yieldable chuck member 13 holds the stud member and a movable member 14 holds the expanding element and forces it into the open end of the attaching portion while the sleeve 15 squeezes the yieldable fingers of the attaching portion together again so that the expanding element cannot fall out.

The method of attachment of the stud unit is simple and particularly adapted for securing snap fastener elements to sheet metal objects and for use on objects such as wind shield posts (Fig. 1) the inside of which is not accessible. Furthermore, the attachment is such that only a relatively small space is required beyond the inner face of the object.

When securing a stud unit to a wind shield post, as shown in the drawings, the attaching portion 2 is passed into a pre-formed hole, as shown in Fig. 2. Then a suitable tool is pressed against the bulged portion 10 to flatten it. During the flattening operation the bulged portion contacts with the end of the expanding element 11 to move it axially toward the tapered wall 9 thereby expanding the attaching portion beyond the inner face of the wall of the post, as shown in Figs. 1 and 3. It should also be noted that a recess 16 is formed in the head of the stud when the bulged portion is flattened. This recess 16 is adapted to receive the rivet 17 of the socket assembly 18, as shown in Fig. 3.

By making the attaching portion 4 somewhat resilient it is not necesssary to form accurate holes in the objects to which the fastener elements are to be attached. This, of course, is a desirable advantage because it allows for substantial manufacturing tolerances.

The expanding element 11 shown in Figs.

2 and 3 is pressed from sheet metal, but it may be made of solid stock if desirable.

The fastener element which I have described is simple, efficient and durable. It is reduced to a minimum number of parts for this type of fastener and when attached presents a neat and finished appearance as there is no hole in the head to expose the inner portions of the unit. Furthermore, as the head is closed, no water, dust or dirt can pass into the unit.

While I have illustrated and described a preferred embodiment of the invention, I do not wish to be limited thereto, therefore reference is made to the following claims to indicate the scope of my invention.

Claims:

1. A hollow fastener member having a closed head, at one end thereof, a tubular attaching portion extending axially from said head, axially movable means within the fastener member adapted to contact with and expand said attaching portion to secure the fastener member to a support and depressible means provided as a part of the closed head and adapted when depressed to move said axially movable means.

2. A hollow fastener member having a closed head, at one end thereof, a tubular attaching portion extending axially from said head and divided by a number of slits to permit expansion of the side wall thereof, axially movable means within the fastener member adapted to contact with and expand said attaching portion to secure the fastener member to a support and depressible means provided as a part of the closed head and adapted when depressed to move said axially movable means.

3. A one-piece hollow fastener member having a closed head, at one end thereof, a tubular attaching portion extending axially from said head, axially movable means within the fastener member adapted to contact with and expand said attaching portion to secure the fastener member to a support and depressible means provided as a part of the closed head and adapted when depressed to move said axially movable means.

4. A snap fastener stud having a socket-receiving head having a central bulged portion, an expansible attaching portion extending from said head, and an axially movable expanding element assembled within the fastener stud and adapted to be moved axially to expand said expansible portion by flattening said bulged portion.

5. A snap fastener stud pressed from a single piece of metal and having a socket-receiving head having a central bulged portion, an expansible attaching portion extending from said head, and an axially movable expanding element assembled within the fastener stud and adapted to be moved axially to expand said expansible portion by flattening said bulged portion.

6. A snap fastener stud having a socket-receiving head having a central bulged portion, a split attaching portion extending from said head, means providing a tapered surface at the free end of said attaching portion and an axially movable element assembled within said stud and adapted to be moved against said tapered surface by flattening said bulged portion thereby to expand the split attaching portion.

7. A snap fastener stud having a socket-receiving head having a central bulged portion, a split attaching portion extending from said head, means providing a tapered surface at the free end of said attaching portion, an axially movable element assembled within said stud and adapted to be moved against said tapered surface by flattening said bulged portion thereby to expand the split attaching portion, and a recess formed in said head when said bulged portion is flattened.

In testimony whereof, I have signed my name to this specification.

MOSES F. CARR.